Jan. 28, 1947.   B. C. WRIGHT   2,414,994
PIPE LINE PLOW
Filed Jan. 15, 1943   3 Sheets-Sheet 3
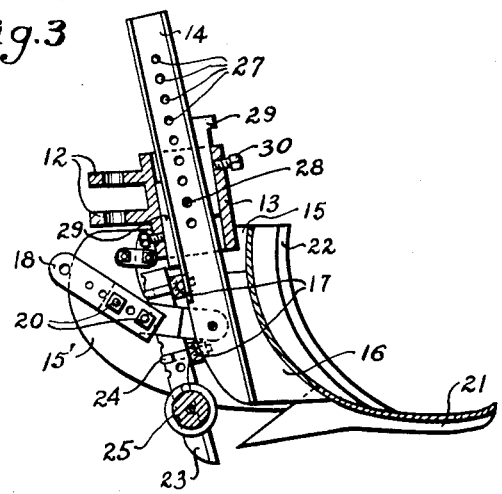
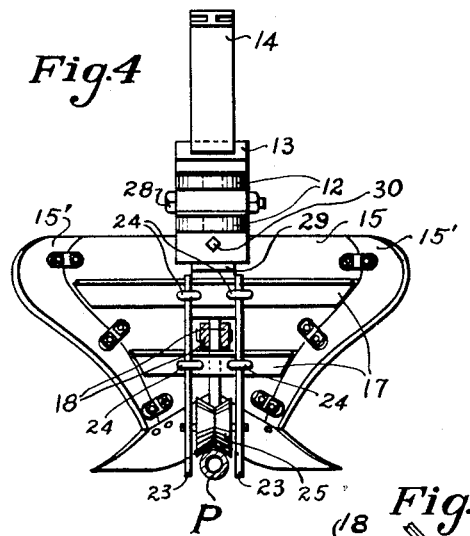
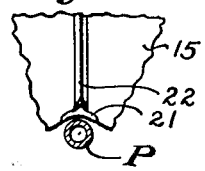
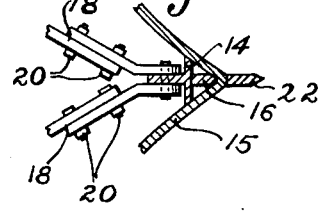
Bert C. Wright
INVENTOR.
BY
ATTORNEY.

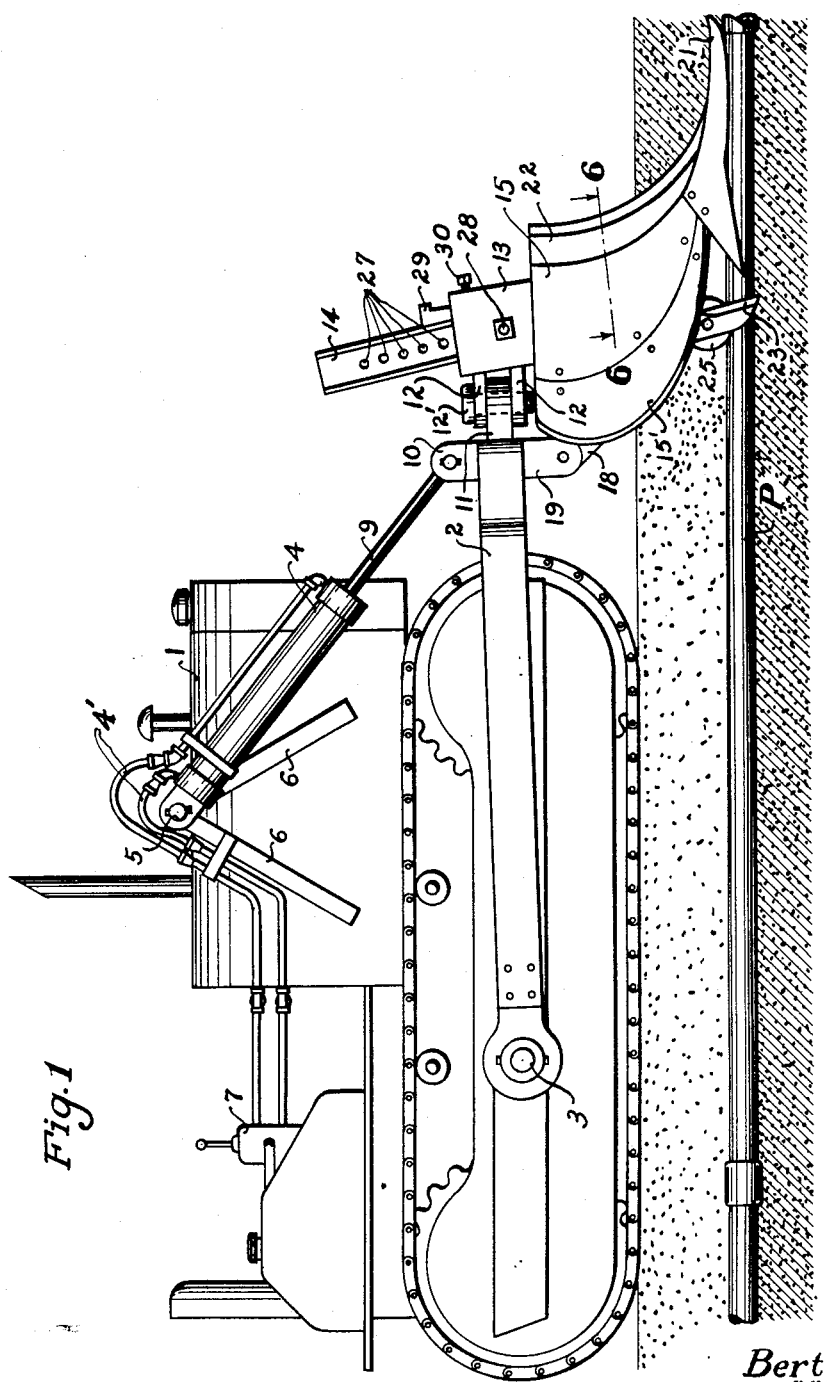

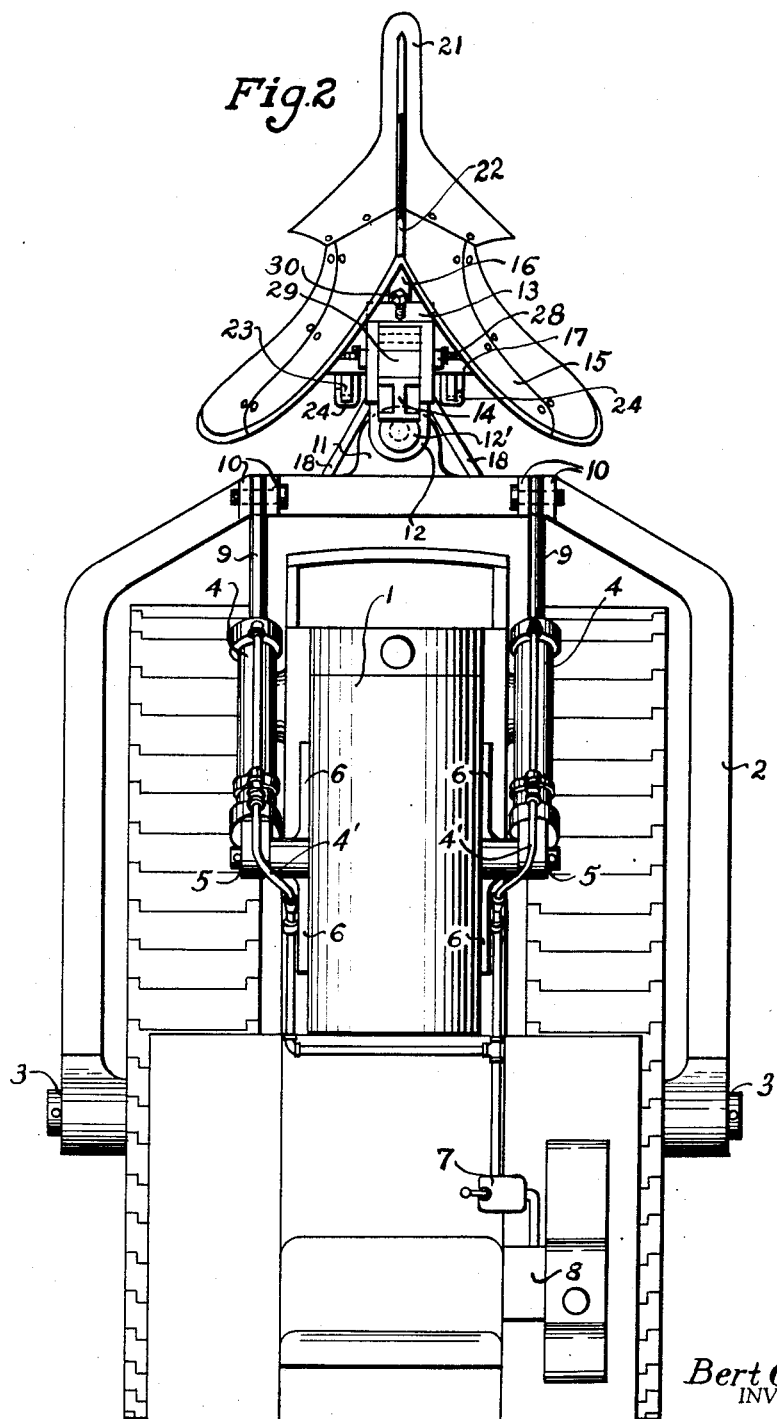

UNITED STATES PATENT OFFICE 2,414,994

PIPE-LINE PLOW

Bert C. Wright, Wichita Falls, Tex.

Application January 15, 1943, Serial No. 472,523

7 Claims. (Cl. 37—98)

This invention relates to improvements in pipe line plows, and more particularly to a plow for stripping the earth from a pipe line which is buried therein, and for opening a ditch in which to lay the pipe line and for filling in the ditch after the pipe line is laid.

An object of this invention is to provide for the removal of dirt from a pipe line in such manner as to render it readily removable from the earth with a minimum amount of manual labor.

Another object of this invention is to provide an attachment for the forward end of a tractor for opening furrows and for filling dirt into furrows.

This present invention is designed to meet all the functions demanded of a tool in handling earth that must be removed and replaced in pipe line work.

A preferred embodiment of this invention is illustrated in the accompanying drawings, in which:

Fig. 1 is a side elevation of a crawler type tractor with the invention installed on the forward end thereof;

Fig. 2 is a top plan view thereof;

Fig. 3 is a longitudinal sectional view through the plow structure removed from the supporting frame;

Fig. 4 is a rear elevation thereof;

Fig. 5 is a fragmentary view of the front of the plow point showing the concave under surface thereof; and Fig. 6 is a detail section on the line 6—6 of Fig. 1.

With more detailed reference to the drawings, the numeral 1 designates a tractor which is preferably of the crawler type, having a U-frame 2 around the front end portion thereof, such as is used for road graders, bulldozers and the like. This frame 2 is pivoted at 3 to opposite sides of the tractor 1, and is raised and lowered by double acting hydraulic power devices 4, each of which is pivoted at one end thereof at 5 to braces 6 which are attached to the frame work of the tractor 1. The hydraulic power devices 4 are operated by a hydraulic system, controlled by a valve 7 which directs the flow of fluid through flexible hoses 4' from a pump 8 into a predetermined end of each power device 4. This actuates a piston rod 9 which has its outer end pivoted to a lug 10 which is secured to the frame 2. Upon directing the hydraulic fluid into the upper ends of the power devices 4, the pistons will move downward causing the frame 2 to swing downward about the pivots 3.

The frame 2 has a lug 11 on the forward end thereof to receive in embracing relation a pair of lugs 12 which are pivoted thereto by a pin 12'. The lugs 12 are attached to a box or socket 13 which slidably receives a beam 14 therethrough. The beam 14 has a double moldboard plow 15 secured to the lower end thereof by a plate 16 and by transverse brace bars 17, as shown in Figs. 3 and 6. A pair of braces 18 diverge from the lower end of beam 14 and extend to lugs 19 on the lower side of frame 2. These braces 18 are made adjustable as to length by being made of sections which are adjustably secured together by bolts 20, to provide for angular adjustment of the plow 15.

The plow point 21 has an extended nose which is upturned at its outer end so as to cause the plow to be guided over irregularities in the pipe line, such as collars, couplings, welding and the like, when they are encountered. The plow point 21 has a concave under surface, as shown in Fig. 6, so as to aid in centering the plow over the pipe. A knife 22 is secured to the apex of the plow to cut roots and loosen the earth ahead of the plow. Extension wings or mold boards 15' may be provided for attachment to plow 15, and when attached thereto provide for the opening of wider furrows.

Knives or colters 23 are secured to the brace bars 17 by J-bolts or U-bolts 24, engaging notches in the edges of the knives, which also permit of vertical adjustment of said knives. Holes are provided in the coulters or knives 23 for selective vertical adjustment of the roller 25 relative thereto. It is preferable to adjust the roller 25 upward so that the points of the coulters 23 will be guided on a level at or near the bottom of the pipe line that is being removed. Knives or colters 23 are adjusted preferably so that they loosen the earth approximately to the bottom of the pipe line, and they are adjusted transversely of the plow according to the size of pipe so they will operate in close proximity to the sides of the pipe line P on opposite sides thereof for loosening the earth therealong.

A concave roller 25 is mounted intermediate the knives or colters 23, as shown in Fig. 4, and serves to center the plow over the pipe line P. The roller 25 also prevents the plow point 21 from making actual frictional contact with the pipe line P, as it is preferable for the point to ride a fraction of an inch above the pipe line and thus prevent undue wear thereupon.

The beam 14 has a series of holes 27 therein to receive selectively a supporting bolt 28, providing for adjustment of the plow with respect to the frame 2. The braces 18 likewise should be adjusted to compenstae for the vertical adjustment of the beam 14. The bolt 28 extends transversely through the box 13 centrally thereof. The box 13 is of greater transverse area from front to back than the beam 14, providing space therein on the forward and rearward sides of beam 14 to allow for pivotal movement of said beam about the bolt 28, which will give the proper angular adjustment to the plow point 21. When this proper and desired adjustment is obtained, wedges 29 are inserted into the box 13 against opposite sides of the beam 14 and secured in place by set screws 30. The braces 18 are then secured in rigid relation. This holds the device in adjusted position, gives a very rigid structure, and, due to the angular divergence of the braces 18, the plow is rigidly positioned forward of the frame 2.

Many adjustments may be necessary to adapt the plow for the individual job of stripping the dirt from the pipe line buried beneath the surface of the ground; namely, the point 21 must have the correct axial position with respect to the length of the pipe line; adjustment must be made for the depth and size of the pipe; and still other adjustments made for raising and lowering the beam 14. The inclination of the point must be carefully gauged by the adjustment of the wedges 29 which may be reversed with respect to the position shown, if a more nearly vertical position of the beam 14 is desired. When the proper adjustments of the plow are made, the device is ready for operation.

To operate the invention for stripping the earth from the top of a pipe line P, the depth of which may vary from a few inches to as much as twenty-four inches, the tractor 1 is operated lengthwise over the pipe line. The hydraulic power devices 4 lowers the plow 15 into the ground to a position over the pipe line P with the knives 23 on either side thereof. The power devices 4 may be manipulated either to let the plow "float" on the roller 25 on top of the pipe line under the weight of the frame 2 and plow 15, or, in case the earth is rocky or of such nature that the frame does not present sufficient weight to keep the roller 25 bearing against the pipe line, hydraulic pressure may be applied by pump 8 to the upper ends of the power devices 4, which will hold the roller in contact with the pipe line so the plow will remove the dirt therefrom.

When it is desired to raise the plow for movement from one location to another, the valve mechanism 7 is shifted so as to direct hydraulic fluid into the lower ends of the power devices 4, which will cause the piston rods 9 to be forced upward, swinging the frame 2 about the pivot points 3 which are secured to the frame of the tractor 1. The power devices will swing about the pivots 5 and the flexible hoses 4' will flex sufficiently to allow the plow to be raised to the desired height.

Many forms of lifts, both hydraulic and mechanical, are being used on frames to which this invention may be attached. Therefore, the invention is not to be limited to the use of any particular type of lift or to any particular shape of frame or supporting unit, except as hereinafter claimed.

Since it is desirable frequently to open deep furrows or ditches, for the removal of pipe therefrom, the mold boards or wings of the plow have been constructed with detachable sections 15', so that wide or narrow furrows may be made. For deep narrow furrows, the additional wing sections 15' may be detached, and for wide and more shallow ditches, they may be reattached.

Plows forty inches in height have been found to be a practical size for ditching, with the wings thirty-six inches in width, and since the sizes given are only for the purpose of illustration, it is understood that the invention is not to be limited to any particular size, or for use with any particular type of tractor or supporting unit.

While the roller 25 is preferably used with the plow, the roller may be removed therefrom if desired, because the plow point 21 (see Fig. 5) has a concave under surface to conform to the shape of the pipe, and since the under surface of the nose of the point has an outwardly and upwardly sloping front end, the plow will function without the roller, but, the wear on the point 21 will be more rapid.

The invention has been described particularly for the removal of dirt from buried pipe lines, because it has been very difficult heretofore to remove such lines with any degree of speed without injuring the pipe. It is obvious however, that the invention is also adapted for opening furrows or ditches in which to lay a pipe line, and for covering the pipe after it has been laid in the ditch. Due to the mounting of the plow forward of the tractor, a furrow can be made directly beneath a fence. Then the tractor can be moved to the other side of the fence through a gate or other convenient opening, and the furrow opened on the other side of the fence to meet and connect with the one already made. In this manner much manual labor is saved over any plow that might be towed behind a tractor.

I claim:

1. In a pipe line plow, the combination with a self-propelled power vehicle having supporting traction devices arranged to be disposed on opposite sides of a buried pipe line, of a support carried by said vehicle, an upright member carried by said support and mounted thereon for upward and downward movement relative thereto and for swinging movement relative thereto in a substantially vertical plane, a plow adapted for movement along the pipe line directly thereover, means mounting said plow on the upright member for swinging movement of said upright member and said plow longitudinally relative to the vehicle, and adjustable connections between said plow and the support to hold the plow in adjusted position relative thereto.

2. A pipe line plow comprising a support, an upwardly extending beam carried by said support, a double-moldboard plow, a plate between the moldboards and supporting the plow on the beam, said plate having an edge thereof abutting directly against the beam, transverse supports interposed between said moldboards, and colters carried by said supports.

3. A pipe line plow comprising a double-moldboard plow, a pair of knives mounted on the plow in laterally spaced relation to straddle a pipe line therebetween, and a roller mounted between said knives in position to ride on the pipe line.

4. A pipe line plow comprising a double-moldboard plow having a point at the forward end thereof, said point having an upwardly and forwardly inclined end portion, said point having a concave groove at the under surface thereof extending lengthwise of said plow, and a roller mounted between two vertically adjustable coulters to the rearward of said plow and in alignment with said groove and in position to ride on a pipe line.

5. A pipe line plow comprising a double-moldboard plow, and a pair of adjustable colters mounted on the plow in laterally spaced relation in position to straddle a pipe line therebetween, a roller positioned between said colters and spaced upward from the bottom thereof, said roller being adjustable relative to said colters.

6. A pipe line plow comprising a double-moldboard plow, a transverse support interposed between the moldboards, and colters carried by said supports in position to straddle a pipe line therebetween.

7. A pipe line plow comprising a double-moldboard plow, transverse supports extending between the moldboards, colters having upright portions and arranged in position to straddle a pipe line therebetween, and means for securing the upwardly extending portions in laterally bearing relation against the supports.

BERT C. WRIGHT.